(12) United States Patent
Satchell, Jr.

(10) Patent No.: US 7,395,823 B2
(45) Date of Patent: Jul. 8, 2008

(54) METHOD AND APPARATUS FOR LOCAL FLUORINE AND NITROGEN TRIFLUORIDE PRODUCTION

(75) Inventor: Donald P. Satchell, Jr., Chatham, NJ (US)

(73) Assignee: The BOC Group, Inc., Murray Hill, NJ (US)

( * ) Notice: Subject to any disclaimer, the term of this patent is extended or adjusted under 35 U.S.C. 154(b) by 468 days.

(21) Appl. No.: 11/098,694

(22) Filed: Apr. 4, 2005

(65) Prior Publication Data

US 2005/0224093 A1 Oct. 13, 2005

Related U.S. Application Data

(60) Provisional application No. 60/561,180, filed on Apr. 9, 2004.

(51) Int. Cl.
C23C 16/44 (2006.01)

(52) U.S. Cl. ............ 134/1.1; 134/22.1; 423/210; 423/406; 423/489

(58) Field of Classification Search ............ 134/1.1, 134/22.1; 423/210, 406, 489
See application file for complete search history.

(56) References Cited

U.S. PATENT DOCUMENTS

| 4,091,081 | A | * | 5/1978 | Woytek et al. | 423/406 |
| 5,637,282 | A | * | 6/1997 | Osborne et al. | 423/235 |
| 5,637,285 | A | * | 6/1997 | Coronell et al. | 423/406 |
| 6,843,258 | B2 | * | 1/2005 | Shang et al. | 134/22.1 |
| 6,986,874 | B2 | * | 1/2006 | Satchell et al. | 423/406 |

* cited by examiner

Primary Examiner—Gregory Webb
(74) Attorney, Agent, or Firm—David A. Hey

(57) ABSTRACT

The present invention relates to a process for production, shipment, and treatment of a $NH_4F(HF)_x$ feedstock for local production of fluorine and $NF_3$ for semiconductor chamber cleaning without the need for storage of large quantities of dangerous feeds and intermediate products.

17 Claims, 3 Drawing Sheets

METHOD AND APPARATUS FOR LOCAL FLUORINE AND NITROGEN TRIFLUORIDE PRODUCTION

This application claims priority from U.S. Provisional applications Ser. No. 60/561,180 filed Apr. 9, 2004.

FIELD OF THE INVENTION

The present invention relates to a method for local production of fluorine ($F_2$) and nitrogen trifluoride ($NF_3$) semiconductor processing gases, such as chamber cleaning gases for large-scale semiconductor production facilities. More specifically, this invention relates to a method for remote preparation of a $NH_4F(HF)_x$ solution that can be safely shipped to a $F_2$ and $NF_3$ production facility and for the conversion of the $NH_4F(HF)_x$ solution to the $F_2$ and $NF_3$ products.

BACKGROUND OF THE INVENTION

Semiconductor products are generally produced via batch processing steps that use gases to deposit or selectively etch semiconductor layers on substrates within a vacuum chamber. Most of the chemical by-products and unused reagents from these deposition and etch processes are exhausted from the chamber by a vacuum pump. However, some residue unavoidably deposits on the chamber walls and must be removed periodically in order to maintain product quality. Usually this residue is removed with gas mixtures containing some fluorine-containing cleaning gas, such as $NF_3$, $SF_6$, $C_2F_6$, or $CF_4$, which is usually diluted with argon or helium.

Unfortunately, $SF_6$, $NF_3$, $C_2F_6$, and $CF_4$ have very high global warming potentials, i.e. respectively about 23,900, 10,090, 9,200, 6,500 times $CO_2$ on a weight average basis over a 100 year time-frame, respectively. While some fluorine containing cleaning gases have much lower global warming potentials, $F_2$ and $ClF_3$ for example, these cleaning gases are very toxic, highly reactive, and difficult to handle safely. These problems are exacerbated by the more recent trend to use semiconductor production techniques for the production of larger and larger flat panel displays that require a significant increase in the quantity of chamber cleaning gas. In particular, there is a significant increase in the associated environmental and safety issues. Moreover, because flat panel displays have much lower product prices per unit area than computer central processing or memory module units, non-productive cleaning time and the cleaning gas cost represent an increasing share of the total flat panel display cost. Therefore, there is a need in the art to ameliorate environmental concerns while maintaining safety and process efficiency.

$NF_3$ is the most common chamber cleaning gas and is typically produced by the reaction of fluorine with a $NH_4F(HF)_x$ salt, such as by the following reaction:

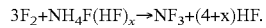
$$3F_2+NH_4F(HF)_x \rightarrow NF_3+(4+x)HF.$$

The reaction may be carried out in an electrolytic cell (as shown in U.S. Pat. No. 3,235,474) or in a separate reactor (as shown in U.S. Pat. No. 4,091,081). Alternatively, $NF_3$ production from urea and fluorine has been proposed (as shown in U.S. Pat. No. 6,821,496) using the following key step:

$$2CO(NH_2)_2+3F_2 \rightarrow NF_3+NH_2CONHCONH_2+3HF.$$

All these ammonia-based $NF_3$ production processes use half of the fluorine feed to produce $NF_3$ and the other half to produce HF. Therefore, the direct use of fluorine as a chamber cleaning gas would be much more efficient than $NF_3$.

Although $F_2$ is a more efficient and theoretically lower cost chamber cleaning gas than $NF_3$, elemental fluorine has generally not been used because of cylinder shipping and handling safety concerns. On-site fluorine production, via electrolysis of hydrogen fluoride (as described in US Published patent application 2003/0098038), has been suggested as an approach to eliminate the fluorine cylinder handling problems, as well as to decrease global warming emissions, and increase the fluorine use efficiency. However, on-site fluorine production faces two significant challenges.

First, the quantity of the fluorine product that can be safely stored is severely limited by fluorine's high reactivity and toxicity. As a result, significant fluorine plant excess capacity is required to meet the highly variable cleaning gas flow rate requirements of a typical semiconductor production facility. In addition, the fluorine plant must be designed to minimize the probability that a fluorine plant outage and a disruption in semiconductor production. The risk of an outage and the very high opportunity cost for semiconductor plant outages economically justifies a separate back-up cleaning gas supply capability, usually $NF_3$. Therefore, the commercial need for a highly reliable chamber cleaning gas feed system and the highly toxic and reactive nature of fluorine generally requires an oversized and more expensive fluorine production facility as well as a back-up $NF_3$ supply system. In such a case, the theoretical cost savings can not be realized.

Second, the hydrogen fluoride feed necessary for fluorine production is also highly toxic and volatile. Therefore, the large hydrogen fluorine feed inventories required, especially for flat panel display plants, pose a significant health risk that must be mitigated. For this reason, large-scale fluorine production facilities are usually located in relatively sparsely populated areas with a large buffer land area around the production facility. However, large-area display production facilities are often located in areas with high population densities and land prices. Therefore, there remains a need for a flexible fluorine and nitrogen trifluoride production and supply capability that avoids large inventories of toxic and volatile feeds and products.

SUMMARY OF THE INVENTION

The present invention overcomes the disadvantages noted above by providing a method for remote preparation of a $NH_4F(HF)_x$ solution that may be safely shipped to a $F_2$—$NF_3$ production facility and for converting the shipped $NH_4F(HF)_x$ solution to a $NH_4F(HF)_x$ feed appropriate for $NF_3$ production and to a HF feed appropriate for $F_2$ production.

DETAILED DESCRIPTION OF THE INVENTION

Figure 1:
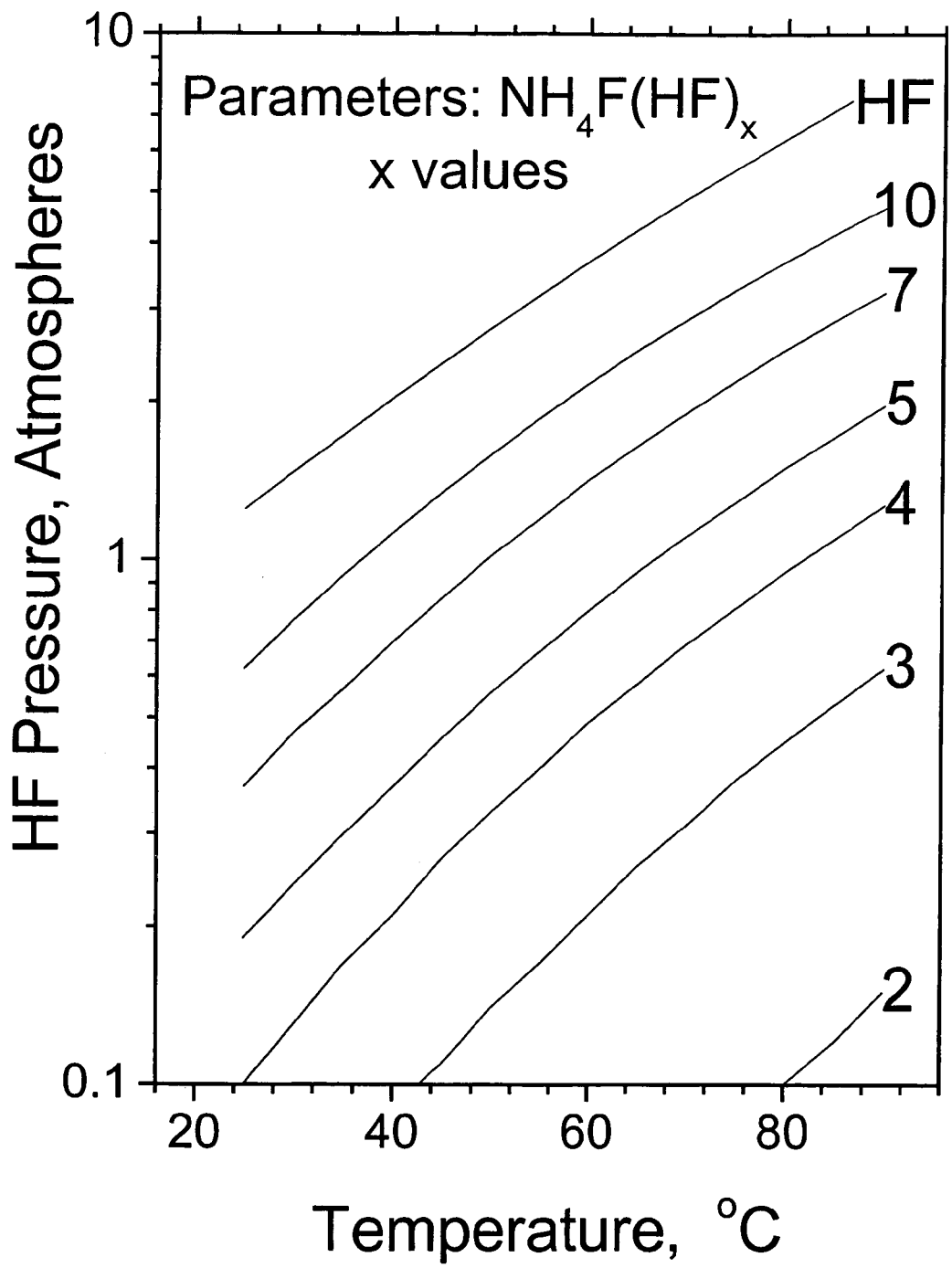
FIG. 1 is a plot of the logarithm of the hydrogen fluoride vapor pressure as a function of temperature with parameters of $NH_4F(HF)_x$ melt acidity x value.

In accordance with the present invention an $NH_4F(HF)_x$ solution is produced by the reaction of anhydrous HF and ammonia. The anhydrous HF feed should be appropriate for fluorine production. Moisture is the most problematic HF impurity and should be less than 10 ppm. The ammonia feed should also have a low moisture content as well as a low and hydrocarbon content, each less than 10 ppm. The $NH_4F(HF)_x$ salt solution is produced by the reaction of the HF acid and ammonia base with cooling and an excess of $NH_4F(HF)_x$ salt to prevent localized over heating. FIG. 1 presents the HF pressure as a function of temperature and selected values of $NH_4F(HF)_x$ solution acidity x. The $NH_4F(HF)_x$ salt solution for transportation preferably has a $NH_4F(HF)_x$ solution acidity x value less than 10, more preferably less than 7, and most preferably less than 5 in order to decrease the shipping container pressure and HF release rate in the event of a containment failure. The shipping container may be advantageously pressurized with a moderate amount of an inert gas, such as dry nitrogen, to prevent ingression of atmospheric contaminates.

Figure 2:
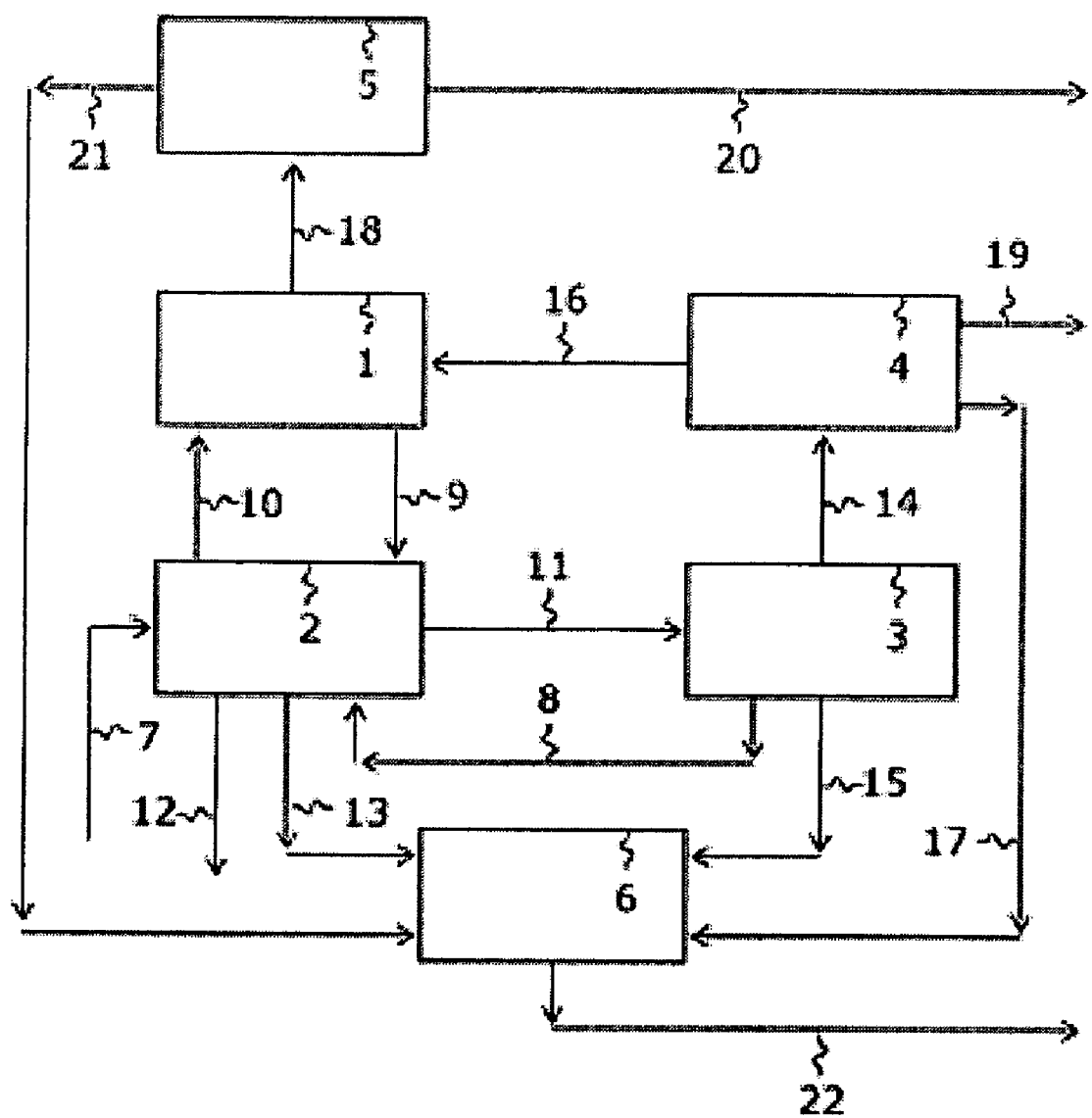
FIG. 2 is a block diagram of a $F_2$ and $NF_3$ production facility.

FIG. 2 is a block flow diagram for the fluorine and nitrogen trifluoride production facilities. The system shown in FIG. 2 includes a $NF_3$ production unit 1, an HF production unit 2, an $F_2$ production unit 3, an $F_2$ purification and storage unit 4, an $NF_3$ purification and storage unit 5, and a facility abatement unit 6, interconnected and operable as will be more fully described below.

A $NH_4F(HF)_x$ feed stream 7 provides the $NH_4F(HF)_x$ solution to the HF production unit 2, where some of the $NH_4F(HF)_x$ solution is provided to $NF_3$ production unit 1, via feed line 10. In addition, some of the $NH_4F(HF)_x$ solution is heated, and optionally reacted with $F_2$ in the HF production unit 2 to produce HF and then provide such HF to $F_2$ production unit 3, via feed line 11. The optional $F_2$ for use in the HF production unit 2, is fed via feed line 8, from the $F_2$ production unit 3. Waste gas from the HF production unit 2, is sent to the facility abatement unit 6, via waste line 13, for proper disposal.

The $F_2$ production unit 3, produces a crude $F_2$ product stream that is sent to the $F_2$ purification and storage unit 4, via product line 14. In addition, a waste gas, primarily comprising $N_2$ and $H_2$, is sent to facility abatement unit 6, for proper disposal via waste line 15. As noted above, some of the $F_2$ from the $F_2$ production unit 3, may optionally be sent to HF production unit 2, is fed via feed line 8.

The $F_2$ purification and storage unit 4, provides a purified stream of $F_2$ to the semiconductor plant via feed line 19, and also provides a $F_2$ feed to $NF_3$ production unit 1, via feed line 16. Waste gas from the $F_2$ purification and storage unit 4, is sent to the facility abatement unit 6, via waste line 17, for proper disposal.

The $F_2$ provided to $NF_3$ production unit 1, reacts with a large excess of $NH_4F(HF)_x$ solution provided to the $NF_3$ production unit 1, via feed line 10, from HF production unit 2. $NF_3$ is produced in the $NF_3$ production unit 1 in accordance with the following reaction:

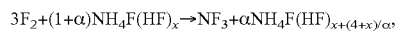

$$3F_2 + (1+\alpha)NH_4F(HF)_x \rightarrow NF_3 + \alpha NH_4F(HF)_{x+(4+x)/\alpha},$$

In this formula, α represents the ratio of the $NH_4F(HF)_x$ product rate to its stoichiometric feed rate. Ammonia may be added to the $NF_3$ production unit 1, to control the $NH_4F(HF)_x$ melt acidity value x in accordance with the following formula:

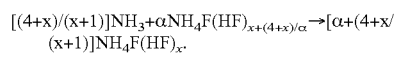

$$[(4+x)/(x+1)]NH_3 + \alpha NH_4F(HF)_{x+(4+x)/\alpha} \rightarrow [\alpha+(4+x/(x+1)]NH_4F(HF)_x.$$

Preferably the $NF_3$ production unit 1, operates with an $NH_4F(HF)_x$ melt acidity x value between 1.4 and 2.0. In this light, the $NH_4F(HF)_x$ feed stream 7, preferably has a melt acidity x value between 5 and 10. In addition, the $NH_4F(HF)_x$ solution feed provided through feed line 10 preferably has a melt acidity x value between 0 and 1.5, more preferably between 0.25 and 1.25, and most preferably between 0.5 and 1. The waste sent through waste line Stream 12, preferably has a melt acidity x value less than 1, more preferably less than 0.5.

During the $NF_3$ production process, corrosion products, such as $NiF_2$ and $CuF_2$ from a Monel reactor wall, accumulate in the $NH_4F(HF)_x$ solution and significantly decrease the $F_2$-to-$NF_3$ conversion efficiency. Therefore, an $NH_4F(HF)_x$ by-product is removed from the $NF_3$ production unit 1, to maintain a constant $NH_4F(HF)_x$ melt volume in the $NF_3$ production unit 1, and to remove the corrosion products. The $NH_4F(HF)_x$ byproduct stream is sent via byproduct line 9, to the HF production unit 2 to produce an appropriate $NH_4F(HF)_x$ feedstock for the $NF_3$ production unit 1, and to concentrate the non-volatile corrosion products in the a heavy metals discard stream, that is discarded via heavy metal waste line 12.

The $NF_3$ production unit 1, also produces a crude $NF_3$ product that is sent to $NF_3$ purification and storage unit 5, via product line 18. The $NF_3$ purification and storage unit 5, provides a purified $NF_3$ stream to the semiconductor plant via product line 20. Waste gas from the $NF_3$ purification and storage unit 5, is sent to the facility abatement unit 6, via waste line 21, for proper disposal.

The facility abatement unit 6, treats the various waste products in an appropriate manner and disposes of the waste via waste line 22.

As is apparent from the above description, the $NH_4F(HF)_x$ solution used in the $NF_3$ production unit 1, may be provided as a new feed stream via feed stream 7 and feed line 10, or may be recycled from the $NF_3$ production unit 1, via byproduct line 9, and feed line 10. As shown in FIG. 2, a single HF production unit 2 (reactor) is utilized in an alternate manner to treat either the $NH_4F(HF)_x$ from feed steam 7 or the byproduct line 9. However, separate reactors could be utilized, particularly since the treatment of the $NH_4F(HF)_x$ solution from feed stream 7 would typically be carried out at different operating conditions than the treatment of $NH_4F(HF)_x$ solution from byproduct line 9. As noted above with respect to $NH_4F(HF)_x$ solution from byproduct line 9, as small portion would be discarded via waste line 12, to remove non-volatile impurities.

Figure 3:
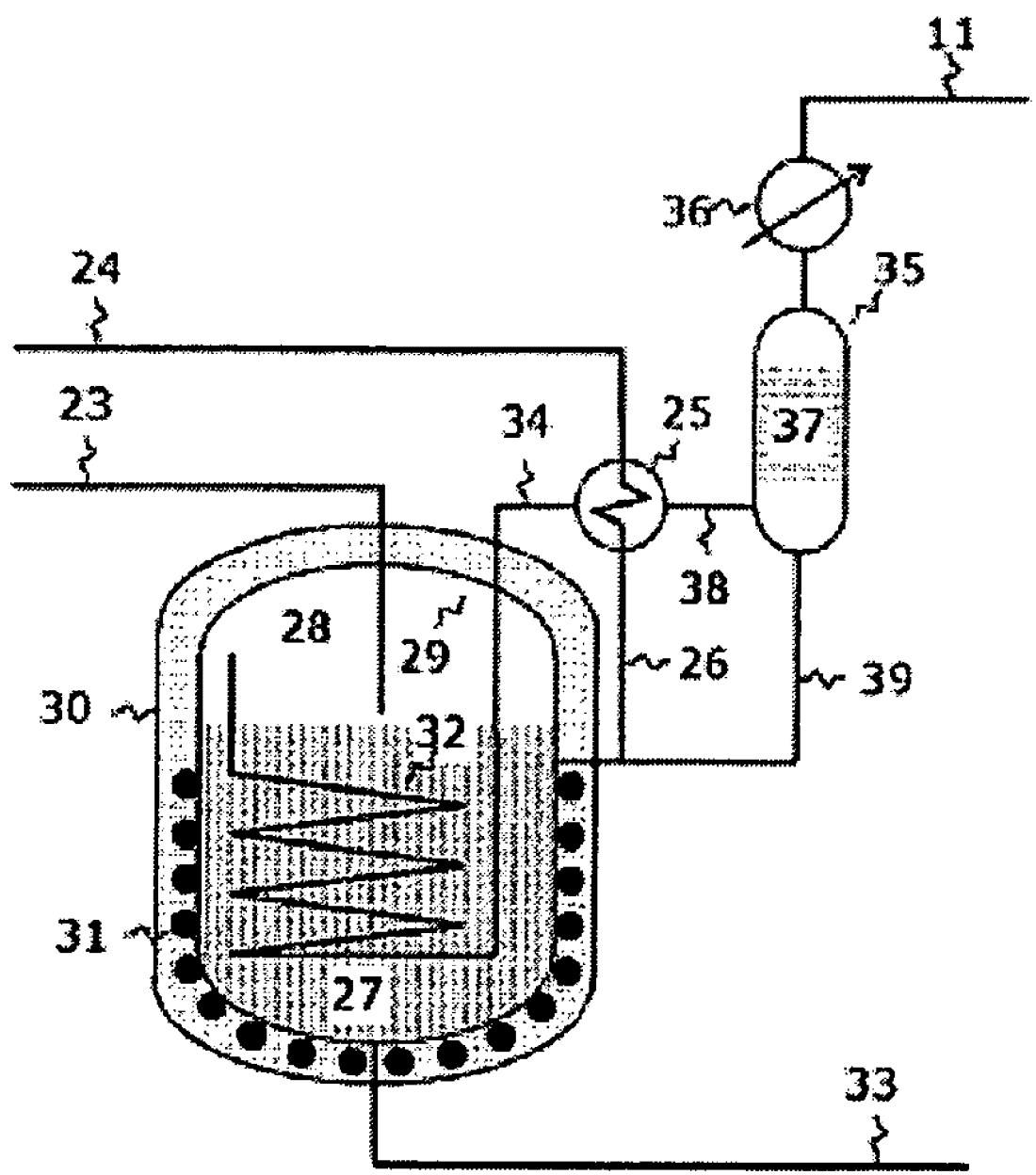
FIG. 3 is a simplified process flow diagram for a method according to the present invention to convert the $NH_4F(HF)_x$ solution for shipment to appropriate $NF_3$ plant $NH_4F(HF)_x$ feed and $F_2$ plant HF feed.

FIG. 3 provides more detail for the HF production unit 2. Where appropriate, like numerals have been used to describe like components as those described with respect to FIG. 2. In particular, the HF production unit 2, includes a reactor 29, having insulation 30, and heater 31. The reactor 29, contains an $NH_4F(HF)_x$ bath 27, and $NH_3$—HF vapor space 28. As noted above, the $NH_4F(HF)_x$ feed 24, may be either from feed stream 7, or byproduct line 9. In either case the $NH_4F(HF)_x$ feed 24, is preferably heated in a heat exchanger 25, and then introduced to the $NH_4F(HF)_x$ bath 27. $NH_3$—HF vapor is produced by heating the $NH_4F(HF)_x$ bath 27, and occupies $NH_3$—HF vapor space 28, preferably at a pressure greater than 1 atmosphere and less than 2 atmospheres, more preferably greater than 1.05 atmospheres, and less than 1.5 atmospheres, and most preferably greater than 1.1 atmospheres and less than 1.25 atmospheres. Heater 31, is advantageously used to heat the $NH_4F(HF)_x$ bath 27, and may be placed on reactor 29 wall, as shown in FIG. 3, or alternatively may be submerged in the $NH_4F(HF)_x$ bath 27. The heater 31, may be pipes using a gaseous or liquid heating medium or electrical resistance elements. The operating temperature for the $NH_4F(HF)_x$ bath 27, is preferably between 200 and 240° C. with the $NH_3$—HF vapor space 28, operating at about 1 atmosphere.

Since the HF latent heat of vaporization ranges from about 10 to 100 kilo-Joules per gram mole HF as the $NH_4F(HF)_x$ melt acidity x value decreases from 20 to about 0.5, the ratio of the flow rate of the HF feed through feed line 11, to the flow rate of $NH_4F(HF)_x$ solution through feed line 33, which is the equivalent to the melt acidity value x, can be most easily controlled by controlling the energy input to the $NH_4F(HF)_x$ feed 24, rate. The higher the energy input, the greater the ratio. The practical limit for the melt acidity value x of the $NH_4F(HF)_x$ solution through feed line 33, and therefore for the ratio is about 0.25. This ratio can be extended beyond this limit by the addition of fluorine from feed line 23, to the HF—$NH_3$ vapor space 28, where the fluorine reacts with the ammonia vapor to produce primarily nitrogen and hydrogen fluoride. A heat exchanger 32, transfers the large heat of reaction to the $NH_4F(HF)_x$ bath 27, to further facilitate the production of HF vapor with smaller quantities of $NH_3$ vapor.

The tempered reactor product 34, comprising $NH_3$, HF, and $NH_4(HF)_x$ is fed to a HF purification column 35, such as a rectifying distillation column equipped with packing 37, and condenser 36. The HF purification column 35, produces an appropriate HF feed for feed line 11, and a $NH_4(HF)_x$ recycle stream 39, that is advantageously added to the $NH_4F(HF)_x$ bath 27. Advantageously, the tempered reactor product 34, may be used as the heat exchange medium for the $NH_4F(HF)_x$ feed, in heat exchanger 25. The $NH_4F(HF)_x$ product 33 on FIG. 3 may be either directed to the $NF_3$ production unit 1 via stream 10 on FIG. 2 or discarded via stream 12 on FIG. 2 to control the non-volatile impurity level. The fluorine from feed line 23, shown in FIG. 3, may advantageously be provided from the $F_2$ production unit 3, via feed line 8, as shown in FIG. 2. The feed line 26, allows for $NH_4(HF)_x$ solution to pass from the heat exchanger 25 to the reactor 29, and feed line 38, allows for product gases to pass from heat exchanger 25 to HF purification column 35.

One advantage of the present invention is that only the $NH_4F(HF)_x$ feed is required for the $F_2$ and $NF_3$ production, whereas the prior art $F_2$ production technology required a volatile anhydrous HF feed and $NF_3$ plants required volatile and toxic $F_2$ and $NH_3$ feeds. Further, the environmental risk of the $NH_4F(HF)_x$ feed can be adjusted by adjusting the $NH_4F(HF)_x$ melt acidity x value, wherein decreasing the $NH_4F(HF)_x$ melt acidity x value decreases the feedstock safety risk, but also increases the plant operating costs. Therefore, the $NH_4F(HF)_x$ melt acidity x value can be optimized in accordance with plant tolerances and risk profiles.

The present invention is also advantageous, because the $F_2$ feed rate to the $NF_3$ production unit and $NF_3$ production rate can be changed rapidly and the $NF_3$ product can be safely stored. Therefore, the $F_2$ production unit can be sized to operate at an optimum production rate based on the average semiconductor plant cleaning gas requirement. If the instantaneous quantity of fluorine required by the semiconductor plant is less than the average, then the $F_2$ flow rate to the semiconductor plant would decrease to meet the cleaning gas demand and the balance of the fluorine production would be used for $NF_3$ production. If the instantaneous quantity of fluorine required by the semiconductor plant was greater than the average, then the $F_2$ feed to the $NF_3$ production unit would decrease or stop and the excess cleaning gas demand would be met by $NF_3$ from storage. Alternatively, the $F_2$ production unit capacity can be higher than the average cleaning gas demand to either increase the fraction of the total plant cleaning gas requirement being met by lower cost $F_2$ cleaning gas or to produce $NF_3$ for other purposes or for sale to other customers, or both.

It is anticipated that other embodiments and variations of the present invention will become readily apparent to the skilled artisan in the light of the foregoing description, and it is intended that such embodiments and variations likewise be included within the scope of the invention as set out in the appended claims.

What is claimed:

1. A method for producing $F_2$ and $NF_3$ cleaning gases for semiconductor chambers, said method comprising:
    producing an $NH_4F(HF)_x$ solution;
    providing said $NH_4F(HF)_x$ solution to an HF production unit;
    heating said $NH_4F(HF)_x$ solution in said HF production unit to produce an $NH_4F(HF)_x$ feed stream and an HF feed stream;
    providing said HF feed stream to an $F_2$ production unit to produce a crude $F_2$ stream;
    providing said crude $F_2$ stream to an $F_2$ purification unit to produce a purified $F_2$ product stream;
    providing said $NH_4F(HF)_x$ feed stream and a portion of said crude or said purified $F_2$ stream to an $NF_3$ production unit to produce a crude $NF_3$ stream; and
    providing said crude $NF_3$ stream to an $NF_3$ purification unit to produce a purified $NF_3$ product stream.

2. A method according to claim 1, further including providing $F_2$ to said HF production unit to increase the production of said HF feed steam.

3. A method according to claim 2, wherein said $F_2$ is a portion of said crude $F_2$ stream.

4. A method according to claim 1, wherein said $NH_4F(HF)_x$ feed stream has an x value of 0.25 to 1.25.

5. A method according to claim 4, wherein said wherein said $NH_4F(HF)_x$ feed stream has an x value of 0.5 to 1.

6. A method according to claim 1, wherein the $NF_3$ production unit operates with the $NH_4F(HF)_x$ feed stream having an x value of 1.4 to 2.

7. A method according to claim 1, wherein the $NH_4F(HF)_x$ solution X value is less than 10.

8. A method according to claim 1, wherein the $NH_4F(HF)_x$ solution X value is less than 7.

9. A method according to claim 1, wherein the $NH_4F(HF)_x$ solution X value is less than 5.

10. A method according to claim 1, further including sending waste from said HF production unit, said $F_2$ production unit, said $F_2$ purification unit, said $NF_3$ production unit, and said $NF_3$ purification unit, is sent to a facility abatement unit.

11. A method according to claim 1, further including providing a portion of said purified $NF_3$ stream to a semiconductor chamber.

12. A method according to claim 1, further including providing a portion of said purified $F_2$ stream to a semiconductor chamber.

13. A method according to claim 1, wherein said $NF_3$ production unit also produces an $NH_4F(HF)_x$ byproduct stream.

14. A method according to claim 11, further including providing said $NH_4F(HF)_x$ byproduct stream to said HF production unit.

15. A method according to claim 12, wherein said HF production unit also produces a corrosion waste stream and further including removing said corrosion waste stream from said HF production unit.

16. A method according to claim 11, wherein said $NH_4F(HF)_x$ feed stream and said HF feed stream are produced alternately from said from $NH_4F(HF)_x$ solution or from said $NH_4F(HF)_x$ byproduct stream.

17. A method according to claim 1, wherein said $NH_4F(HF)_x$ solution is produced at a location remote from said HF production unit, and said $NH_4F(HF)_x$ solution is shipped to the location of said HF production unit.

* * * * *